United States Patent [19]

Maeda

[11] Patent Number: 5,039,116
[45] Date of Patent: Aug. 13, 1991

[54] COMPOSITE OIL-RING

[75] Inventor: Yorishige Maeda, Toyota, Japan

[73] Assignee: Toyota Jidosha Kabushiki Kaisha, Japan

[21] Appl. No.: 520,118

[22] Filed: May 7, 1990

Related U.S. Application Data

[63] Continuation of Ser. No. 330,308, Mar. 29, 1989, abandoned.

[30] Foreign Application Priority Data

Apr. 5, 1988 [JP] Japan .................. 63-45285[U]

[51] Int. Cl.$^5$ ............................................. F16J 9/06
[52] U.S. Cl. ........................... 277/142; 277/193
[58] Field of Search ................. 277/142, 143, 193

[56] References Cited

U.S. PATENT DOCUMENTS

| | | | |
|---|---|---|---|
| 2,231,801 | 2/1941 | Cords | 277/139 |
| 2,321,791 | 6/1943 | Beardsley | 277/175 |
| 3,362,720 | 6/1968 | Henry et al. | 277/176 |
| 3,370,858 | 2/1968 | Braedel | 277/139 |
| 3,400,941 | 9/1968 | Hutto | 277/139 |
| 3,656,770 | 4/1972 | Hoffman | 277/193 X |
| 4,575,107 | 3/1986 | Umegawa | 277/221 |
| 4,844,487 | 7/1989 | Eakin | 277/221 |

FOREIGN PATENT DOCUMENTS

| | | | |
|---|---|---|---|
| 41160 | 11/1929 | Denmark | 277/221 |
| 636202 | 10/1936 | Fed. Rep. of Germany | 277/142 |
| 467876 | 12/1951 | Italy | 277/142 |
| 48-13288 | 4/1973 | Japan . | |
| 2077706 | 9/1966 | Sweden | 277/221 |
| 73952 | 6/1916 | Switzerland | 277/220 |
| 27811 | 12/1902 | United Kingdom | 277/221 |
| 1004370 | 9/1965 | United Kingdom | 277/139 |
| 2164418 | 3/1986 | United Kingdom | 277/221 |

Primary Examiner—William A. Cuchlinski, Jr.
Assistant Examiner—Scott Cummings
Attorney, Agent, or Firm—Kenyon & Kenyon

[57] ABSTRACT

A composite oil-ring comprising an oil control ring disposed on a lower surface of an oil-ring groove, a seal ring disposed on the oil control ring and having substantially no oil path in the radial direction thereof, and a spring seal ring disposed between an upper surface of the oil-ring groove and the seal ring which is constituted as a Belleville spring structure having abutted end portions with no gap in the circumferential direction. The spring seal ring presses upwards against the upper surface of the oil-ring groove and presses downwards against the seal ring, the seal ring is pressed against the oil control ring, and the oil control ring is pressed against the lower surface of the oil-ring groove, by the spring force of the spring seal ring. Both the spring seal ring and seal ring have substantially no oil path in the radially outer direction. Therefore, the oil in the interior of the oil-ring groove can be prevented almost completely from escaping in both radially outward and axially upward directions. As a result, the oil loss through the composite oil-ring can be suppressed to very small value, thereby decreasing oil consumption to a great extent.

11 Claims, 3 Drawing Sheets

COMPOSITE OIL-RING

This application is a continuation of application Ser. No. 07/330,308, filed Mar. 29, 1989, now abandoned.

BACKGROUND OF THE INVENTION

1. Field of the Invention

The present invention relates to an oil-ring for disposition in an oil-ring groove of a piston of an internal combustion engine. More specifically, the invention relates to a composite oil-ring consisting of three ring pieces.

2. Description of the Prior Art

Various oil-rings of different types have been known for use with a piston of an internal combustion engine. Conventional oil-rings can be roughly classified by the following two types. One is a so-called solid oil-ring and the other is a three-piece type oil-ring. Generally, a solid oil-ring is constructed of, mainly, one ring piece which has an expansion force in its radial direction by itself and slidably contacts a cylinder bore. A three-piece type oil-ring is constructed of a pair of side rails and an expander disposed between the side rails and urging the side rails both radially toward a cylinder bore and axially toward the upper or lower surface of an oil-ring groove.

A solid oil-ring usually does not exert a force for sealing between the oil-ring and the upper or lower surface of an oil-ring groove, because one oil-ring is merely disposed in the oil-ring groove and thereafter inserted in a cylinder bore. Moreover, since the solid oil-ring itself has abutted end portions on its circumference, a gap between the abutted end portions forms an oil and gas path in a vertical direction, i.e. a direction along an axis of a cylinder bore.

Japanese Utility Model Publication SHO 48-13288 discloses an oil-ring structure designed to increase the axial sealing force of a solid type oil-ring, thereby reducing oil consumption in an internal combustion engine, as shown in FIG. 8. In FIG. 8, oil-ring 1 installed in oil-ring groove 2 of piston 3 consists of solid ring 4 and spring ring 5 having a belleville spring structure, which slidably contacts cylinder bore 6. Solid ring 4 is pressed onto the upper surface 2a of oil-ring groove 2 by the spring force of spring ring 5.

In the structure shown in FIG. 8, however, since spring ring 5 slidably engages cylinder bore 6 so as to follow the cylinder bore surface in the radial direction thereof, abutted end portions (not shown) of the spring ring must always have a gap in the circumferential direction. The gap between the abutted end portions forms an oil path in the axial direction, and it is difficult to prevent oil from escaping upwards through the oil path to a significant extent. Even if the location of the abutted end portions of spring ring 5 and the location of the abutted end portions of solid ring 4 are displaced from each other in the circumferential direction, it is difficult to decrease the oil loss through the oil-ring portion by a great extent because the oil which has passed through the abutted end portions of spring ring 5 and has entered into the interior of oil-ring groove 2 escapes upwards through the abutted end portions of solid ring 4. Particularly, it is recognized experimentally that oil escapes upwards through the oil-ring portion especially during engine braking, the oil having escaped burns during the next acceleration and evaporates, thereby increasing oil consumption.

In a three-piece type oil-ring, although there is a sealing force between a side rail and the upper or lower surface of an oil-ring groove which is generated by an urging force due to an expander, an oil path in the axial direction is inevitably formed at the abutted end portions of the side rail, because the side rail must follow a cylinder bore in the radial direction both by its own expansion force and by an expansion force exerted by the expander, and there must be a gap in the circumferential direction between the abutted end portions of the side rail in order to ensure that the side rail follows the surface of the cylinder bore.

Therefore, also in the three-piece type oil-ring, there is a problem similar to the problem in a solid oil-ring, with respect to oil loss through the oil-ring portion.

OBJECT AND SUMMARY OF THE INVENTION

An object of the present invention is to provide a composite oil-ring including a solid type oil control ring, which can substantially prevent the formation of an axial oil path past an oil-ring portion, and can decrease oil loss to a great extent, thereby greatly decreasing oil consumption.

The composite oil-ring according to the present invention satisfies the above object and is intended to be disposed in an oil-ring groove formed in a piston which is inserted to move reciprocally in a cylinder bore to constitute a piston and cylinder sealing assembly. The composite oil-ring according to the present invention comprises an oil control ring disposed on a lower surface of the oil-ring groove, an outer surface of the oil control ring in a radial direction of the oil control ring slidably contacting the cylinder bore; a seal ring disposed on an upper surface of the oil control ring, an outer surface of the seal ring in a radial direction of the seal ring slidably contacting the cylinder bore, the seal ring having abutted end portions which are formed a stepped portions engaging each other in the radial direction of the seal ring and substantially having no oil path in the radial direction of the seal ring; and a spring seal ring disposed between an upper surface of the seal ring and an upper surface of the oil-ring groove, with a radial clearance between an inner circumferential surface of the spring seal ring and an adjacent radially opposed circumferential surface of another component of the assembly and a clearance between an outer surface of the spring seal ring and an adjacent radially opposed surface of another component of said assembly, the spring seal ring having abutted end portions of which the abutment gap in a circumferential direction of the spring seal ring is substantially zero when the spring seal ring is installed in the oil-ring groove, the spring seal ring being constituted by a belleville spring structure having a spring force acting in an axial direction of the spring seal ring, a part of an upper surface of the spring seal ring pressing the upper surface of the oil-ring groove and a part of a lower surface of the spring seal ring pressing the upper surface of the seal ring and pressing the oil control ring onto the lower surface of the oil-ring groove via the seal ring by the spring force.

In the composite oil-ring thus constructed, the oil control ring scrapes the oil on the cylinder bore, and most of the scraped oil is returned downwards and a part of the rest of the scraped oil enters into the interior of the oil-ring groove through a gap between the abutted end portions of the oil control ring. At the same time, as the seal ring also slidably contacts the cylinder bore, the seal ring functions as an auxiliary ring for scraping the oil on the cylinder bore. Since it is stochastically rare that the location of the abutted end portions of the oil control ring and the location of the abutted end portions of the seal ring are aligned in the axial direction, the amount of oil which directly passes upwards through both of the abutment gaps is extremely small.

Since the clearance in the radial direction are formed on both sides of the inner and outer surfaces, respectively, of the spring seal ring, it becomes possible to set the abutment gap of the ends of the spring seal ring substantially to zero. In that state, the spring seal ring functions as a belleville spring exerting a spring force in the axial direction. By this spring force, a part of the upper surface of the spring seal ring presses against the upper surface of the oil-ring groove along the whole circumference of the spring seal ring, and a part of the lower surface of the spring seal ring presses against the upper surface of the seal ring, so that the oil control ring is pressed onto the lower surface of the oil-ring groove via the seal ring. As a result, the gaps between the spring seal ring and the upper surface of the oil-ring groove and between the oil control ring and the lower surface of the oil-ring groove are maintained substantially zero. Therefore, the escape of oil from the interior of the oil-ring groove to the outer side and upside of the composite oil-ring, particularly between the spring seal ring and the upper surface of the oil-ring groove, is prevented effectively.

Moreover, since the seal ring substantially does not have an oil path in the radial direction and the abutment gap between the ends of the spring seal ring is zero, the oil that has entered into the interior of the oil-ring groove cannot escape in the radially outer direction through the abutted end portions of the seal ring and the spring seal ring. Therefore, the oil loss due to the escape of oil in this direction becomes substantially zero.

As a result, the amount of the escaping oil upward through the composite oil-ring can be suppressed to an extremely small amount, oil loss can be decreased, and oil consumption can be decreased to a great extent.

BRIEF DESCRIPTION OF THE DRAWINGS

The above and other objects, features and advantages of the present invention will be become apparent and will be more readily appreciated from the following detailed description of the preferred exemplary embodiments of the invention taken in conjunction with the accompanying drawings, in which.

DETAILED DESCRIPTION OF THE PREFERRED EMBODIMENTS

Some preferred embodiments of the present invention will be described hereunder referring to the attached drawings.

Figure 1:
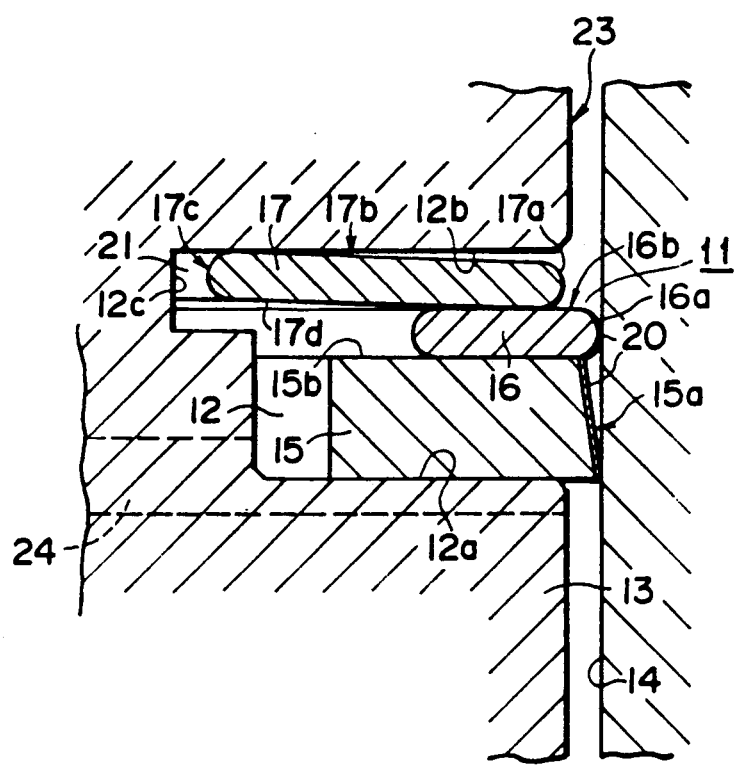
FIG. 1 is a vertical sectional view of a composite oil-ring and its vicinity according to an embodiment of the present invention.
Figure 2:
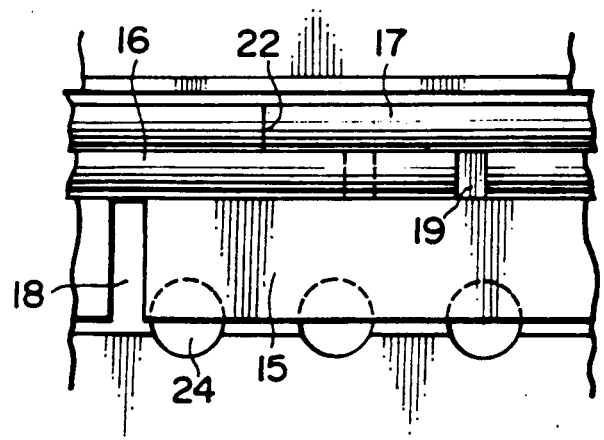
FIG. 2 is a partial elevational view of the composite oil-ring and its vicinity shown in FIG. 1.

FIGS. 1-5 illustrate a composite oil-ring according to an embodiment of the present invention. In FIGS. 1 and 2, a composite oil-ring 11 is disposed in an oil-ring groove 12 formed in a piston 13 which is reciprocally positioned in a cylinder bore 14 of an internal combustion engine.

Composite oil-ring 11 consists of three ring pieces, namely, an oil control ring 15, a seal ring 16 and a spring seal ring 17.

Figure 3:
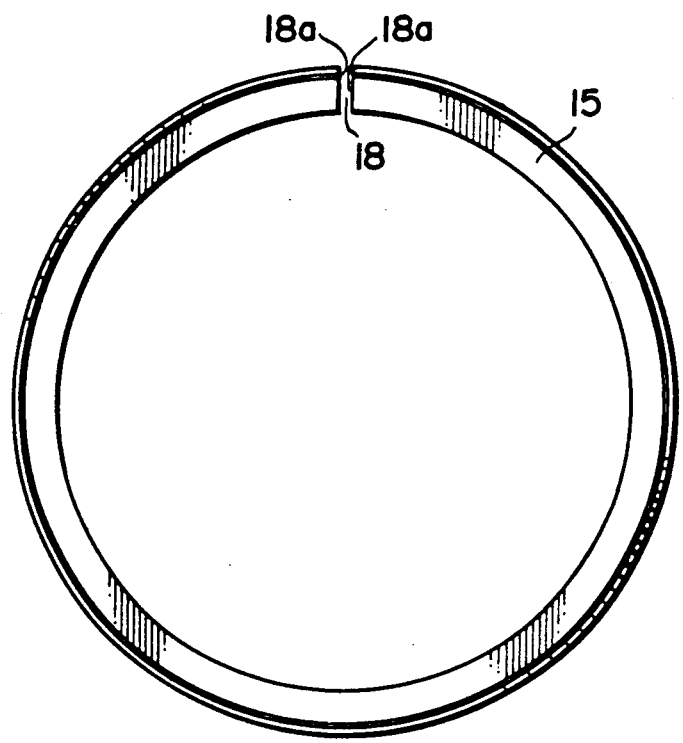
FIG. 3 is an entire plan view of an oil control ring of the composite oil-ring shown in FIG. 1.

Oil control ring 15 is disposed on a lower surface 12a of oil-ring groove 12. A radially outer surface 15a of oil control ring 15 slidably contacts cylinder bore 14. As shown in FIG. 3, oil control ring 15 is constructed of an annular strip having abutted end portions 18a, 18a on its circumference. Abutted end portions 18a, 18a comprise a pair of flat end surfaces facing each other across a gap 18.

Figure 7:
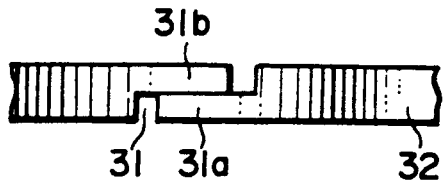
FIG. 7 is a partial elevational view of an oil control ring according to a further embodiment of the present invention.
Figure 8:
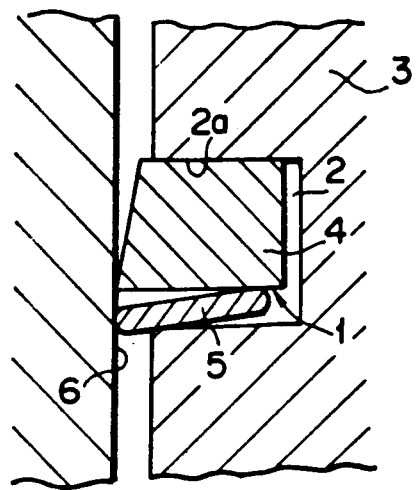
FIG. 8 is a vertical sectional view of a conventional oil-ring and its vicinity.

These abutted end portions may be formed in other configurations. For instance, as shown in FIG. 7, abutted end portions 31a and 31b provided on an oil control ring 32 are formed as stepped portions engaging each other in the axial direction of the oil control ring and with a gap 31 in the circumferential direction.

Figure 6A:
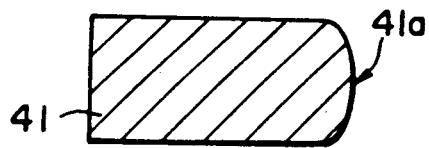
FIGS. 6A and 6B are vertical sectional views of oil control rings according to other embodiments of the present invention.
Figure 6B:
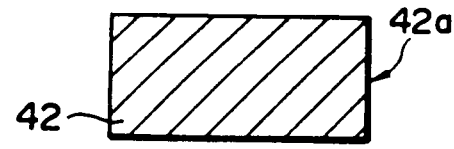

Radially outer surface 15a of oil control ring 15 is formed with a downwardly outward taper, such that only the bottom portion of the outer surface slidably contacts the cylinder bore. The outer surface may be formed in other shapes. For example, in FIG. 6A, an outer surface 41a of an oil control ring 41 has a convex cross section, so that only an axially central portion of the outer surface of the oil control ring will contact a cylinder bore. In FIG. 6B, an outer surface 42a of an oil control ring 42 is formed as a cylindrical surface, substantially the whole of which can contact a cylinder bore.

Figure 4:
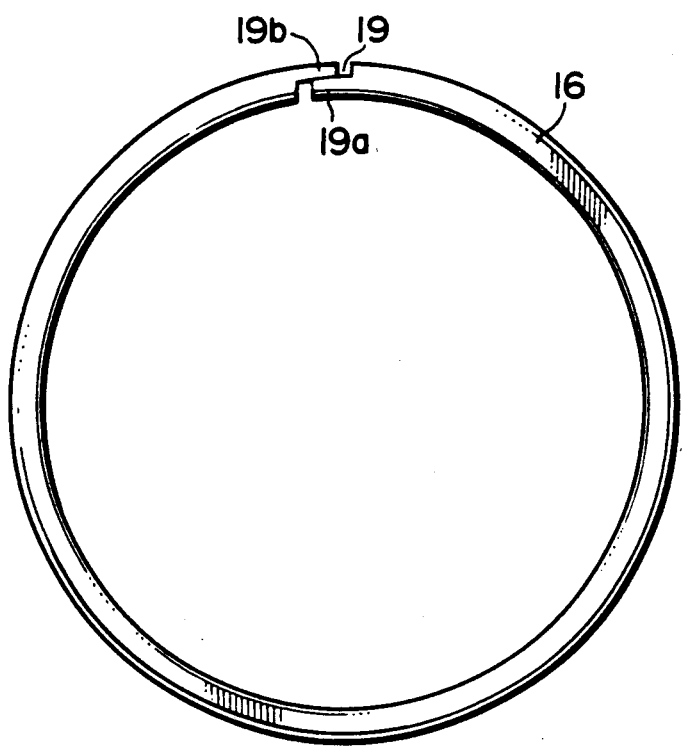
FIG. 4 is an entire plan view of a seal ring of the composite oil-ring shown in FIG. 1.

Seal ring 16 is disposed on an upper surface 15b of oil control ring 15. A radially outer surface 16a of seal ring 16 slidably contacts cylinder bore 14. As shown in FIG. 4, seal ring 16 is constructed of an annular strip having stepped end portions 19a and 19b abutting with a circumferential gap 19, but engaging each other in the radial direction of seal ring 16. Thus, even when the seal ring expands in the circumferential direction, the abutted end portions do not provide an oil path in the radial direction. Therefore, seal ring 16 substantially has no oil path in the radial direction of the ring.

An abrasion-resistant material 20, for example, a hard chrome plating layer, is coated on at least one of, and preferably both outer surfaces 15a and 16a of oil control ring 15 and seal ring 16, in order to increase abrasion resistance thereof.

Spring seal ring 17 is disposed between an upper surface 16b of seal ring 16 and an upper surface 12b of oil-ring groove 12. The inner and outer diameters of spring seal ring 17 are selected so as to define a radial clearance between an inner circumferential surface 17c of the ring and radially opposed circumferential surface of the assembly such as surface 12c of oil-ring groove 12 and a radial clearance between an outer circumferential surface 17a of the ring and a radially opposed circumferential surface of the assembly such as cylinder bore 14 when the ring is installed in the oil-ring groove. Particularly in this embodiment, a groove 21 is formed on circumferential surface 12c of oil-ring groove 12 for creating the above radial clearance between inner surface 17c of spring seal ring 17 and the circumferential surface of the oil-ring groove. If this radial clearance can be formed without groove 21, the groove is not necessary.

Figure 5:
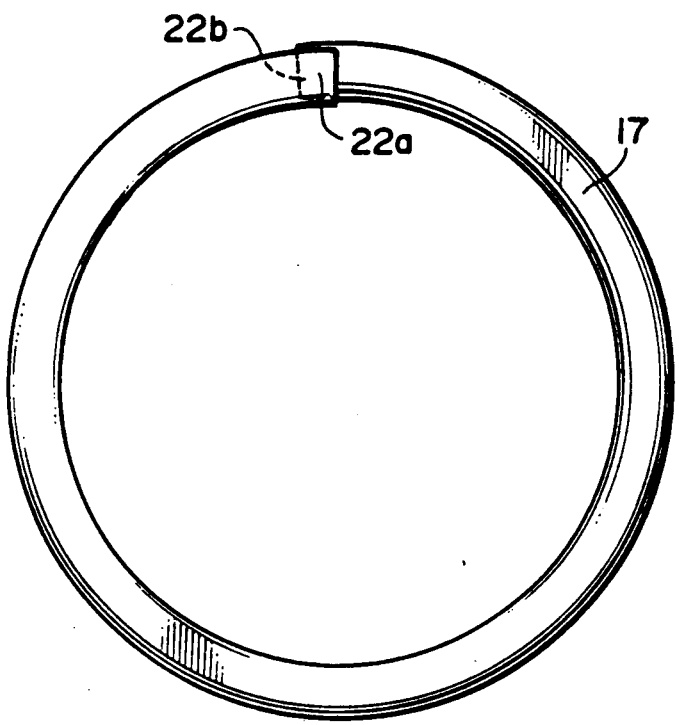
FIG. 5 is an entire plan view of a spring seal ring in its free stat of the composite oil-ring shown in FIG. 1.

Spring seal ring 17 is constructed of an annular strip as shown in FIG. 5 and is constituted as a belleville spring structure. FIG. 5 illustrates spring seal ring 17 in its free state. In the free state, the end portions 22a and 22b of the annular strip overlap each other. Spring seal ring 17 is expanded from the above free state, and thereafter inserted in oil-ring groove 12 so that end portions 22a and 22b abut each other with no gap in the circumferential direction, as shown in FIG. 2. Therefore, the abutment gap 22 in the circumferential direction at abutted end portions of spring seal ring 17 is substantially zero when the ring is installed in oil-ring groove 12.

In this state, as shown in FIG. 1, spring seal ring 17 is constituted as a belleville spring structure having a spring force acting in an axial direction of the ring. A part of an upper surface 17b of spring seal ring 17 presses against upper surface 12b of oil-ring groove 12, and a part of a lower surface 17d of the spring seal ring presses against upper surface 16b of seal ring 16 and thus presses oil control ring 15 onto lower surface 12a of oil-ring groove 12 via the seal ring.

In this embodiment, the outer diameter of spring seal ring 17 when it is installed in oil-ring groove 12 is selected to be smaller than the diameter of piston 13 at a position of a land portion 23 thereof (see FIG. 1). In this way, outer surface 17a of spring seal ring 17 is prevented from directly contacting cylinder bore 14 even when piston 13 slaps.

Moreover in this embodiment, a plurality of oil return paths 24 are provided in piston 13, and each of the oil return paths communicates between lower surface 12a and circumferential surface 12c of oil-ring groove 12 and also with the interior (not shown) of piston 13.

In the above embodiment, the oil on cylinder bore 13 is scraped downwards mainly by the bottom portion of outer surface 15a of oil control ring 15, and a part of the remaining oil on the cylinder bore is scraped downwards by outer surface 16a of seal ring 16. Therefore, composite oil-ring 11 can scrape the oil much more efficiently than the conventional oil-ring constructed of merely one solid ring. Although oil control ring 15 and seal ring 16 can randomly rotate independently, it is stochastically a rare case that circumferential gap 18 of the oil control ring and circumferential gap 19 of the seal ring are axially aligned. Accordingly, as shown in FIG. 2, the arrangement of the oil control ring and the seal ring substantially prevents formation of an axial oil path.

Most of the oil scraped by oil control ring 15 and seal ring 16 is returned directly downwards or downwards from the inside of piston 13 through oil return paths 24. A part of the rest of the scraped oil enters into and stays in the interior of oil-ring groove 12 through the circumferential gap between abutted end portions of oil control ring 15. However, most of this oil in the interior of oil-ring groove 12 is also returned downwards through oil return paths 24.

Since the gap 22 between abutted end portions of spring seal ring 17 is zero and a part of upper surface 17b of the spring seal ring is pressed against upper surface 12b of oil-ring groove 12 along the entire length in the circumferential direction by the spring force of the spring seal ring, the oil in the interior of the oil-ring groove substantially cannot pass outwards either between the upper surface of the oil-ring groove or the spring seal ring and through the spring seal ring itself. Further, a part of lower surface 17d of spring seal ring 17 is pressed against upper surface 16b of seal ring 16 along the entire length in the circumferential direction, and the spring seal ring presses oil control ring 15 onto lower surface 12a of oil-ring groove 12 via the seal ring, by the spring force of the spring seal ring. Therefore, positions between spring seal ring 17 and seal ring 16, between the seal ring and oil control ring 15, and between the oil control ring and lower surface 12a of oil-ring groove 12 are also almost completely sealed. As a result, the oil in the interior of oil-ring groove 12 can be almost completely prevented from escaping upward between land portion 23 and cylinder bore 14.

Moreover, since seal ring 16 substantially has no oil path in the radial direction and the abutment gap 22 at the abutted end portions of spring seal ring 17 is substantially zero, no oil path in the radial direction is formed from the interior of oil-ring groove 12 to the radially outer side through the seal ring and the spring seal ring. Therefore, the oil in the interior of oil-ring groove 12 can be prevented almost completely from escaping also in the radially outer direction. The zero circumferential gap between the abutted end portions of spring seal ring 17 is possible because of the radial clearance inside and outside of the ring.

As a result, loss of the oil from the interior of oil-ring groove 12 can be prevented almost completely in both the radially outward and axially upward directions, thereby decreasing oil consumption to a great extent.

Although only preferred embodiments of the present invention have been described in detail, it will be appreciated by those skilled in the art that various modifications and alterations can be made to the particular embodiments shown without materially departing from the novel teachings and advantages of the present invention. Accordingly, it is to be understood that all such modifications and alterations are included with in the scope of the invention as defined by the following claims.

What is claimed is:

1. Composite oil-ring disposed in an oil-ring groove of a piston reciprocally positioned in a cylinder bore to constitute a piston and cylinder sealing assembly, the composite oil-ring comprising:

an oil control ring disposed on a lower surface of said oil-ring groove, a radially outer surface of said oil control ring slidably contacting said cylinder bore;

a seal ring disposed on an upper surface of said oil control ring, a radially outer surface of said seal ring slidably contacting said cylinder bore, said seal ring having overlapped end portions which are formed as stepped portions engaging each other in the radial direction of said seal ring and having substantially no oil path in the radial direction of said seal ring; and a spring seal ring disposed between an upper surface of said seal ring and an upper surface of said oil-ring groove with a radial clearance between a radially inner circumferential surface of said spring seal ring and a radially opposed circumferential surface of a radially inward adjacent component of the assembly and a radial clearance between a radially outer circumferential surface of said spring seal ring and a radially opposed circumferential surface of a radially outward adjacent component of said assembly, said spring seal ring having butted end surfaces with substantially zero abutment gap between the end surfaces when said spring seal ring is installed in said oil-ring groove, said spring seal ring being constituted as a belleville spring structure exerting a spring force in an axial direction of said spring seal ring, a circumferentially continuous part of an upper surface of said spring seal ring pressing against said upper surface of said oil-ring groove, and a circumferentially continuous part of a lower surface of said spring seal ring pressing against said upper surface of said seal ring and pressing said oil control ring against said lower surface of said oil-ring groove via said seal ring by said spring force.

2. The composite oil-ring of claim 1, wherein said outer surface of said oil control ring is formed with a downwardly outward taper.

3. The composite oil-ring of claim 1, wherein said outer surface of said oil control ring is formed with a convex cross section such that only a central portion on said outer surface contacts said cylinder bore.

4. The composite oil-ring of claim 1, wherein said outer surface of said oil control ring is formed as a cylindrical surface, substantially the whole of which contacts said cylinder bore.

5. The composite oil-ring of claim 1, wherein said oil control ring comprises abutted end portions formed as a pair of flat end surfaces facing each other.

6. The composite oil-ring of claim 1, wherein said oil control ring comprises abutted end portions formed as stepped portions engaging each other in the axial direction of said oil control ring.

7. The composite oil-ring of claim 1, wherein an abrasion-resistant material is coated on at least one of said radially outer surface of said oil control ring and said radially outer surface of said seal ring.

8. The composite oil-ring of claim 7, wherein said abrasion-resistant material is a hard chrome plating layer.

9. The composite oil-ring of claim 1, wherein the outer diameter of said spring seal ring when it is installed in said oil-ring groove is smaller than the diameter of a land portion of said piston adjacent to the oil-ring groove.

10. The composite oil-ring of claim 1, wherein a circumferential groove is formed in a circumferential surface of said oil-ring groove for creation of said radial clearance between said radially inner circumferential surface of said spring seal ring and said radially opposed circumferential surface of said radially inward adjacent component of the assembly.

11. The composite oil-ring of claim 1, wherein said piston has an oil return path provided from said lower surface of said oil-ring groove and an inner circumferential surface of said oil-ring groove to an inside region of said piston.

* * * * *